United States Patent [19]
Ash

[11] Patent Number: 5,487,800
[45] Date of Patent: Jan. 30, 1996

[54] METHOD OF MAKING A COVERED ARTICLE BY VACUUM DRAWING

[75] Inventor: Robert A. Ash, Baltimore, Canada

[73] Assignee: Davidson Textron Inc., Dover, N.H.

[21] Appl. No.: 185,127

[22] Filed: Jan. 24, 1994

[51] Int. Cl.⁶ .......................... B32B 31/04; B32B 31/12; B32B 31/20
[52] U.S. Cl. ..................... 156/87; 156/212; 156/214; 156/216; 156/285; 180/90; 264/511; 280/752; 296/70
[58] Field of Search ...................... 156/214, 216, 156/212, 285, 87, 245; 264/511, 510, 513, 516; 428/31; 180/90; 280/752; 296/70

[56] References Cited

U.S. PATENT DOCUMENTS

| | | | |
|---|---|---|---|
| 2,766,808 | 10/1956 | Kleiber et al. | 156/214 X |
| 3,202,561 | 8/1965 | Swanson et al. | 156/216 |
| 4,692,199 | 9/1987 | Kozlowski et al. | |
| 4,986,865 | 1/1991 | Fujii | 156/214 |

FOREIGN PATENT DOCUMENTS 2112831  12/1971  Germany .................. 156/214

Primary Examiner—Adrienne C. Johnstone
Attorney, Agent, or Firm—Reising, Ethington, Barnard & Perry

[57] ABSTRACT

A covered article such as an automotive trim panel comprises a substrate having a front surface to be covered, a back surface and a plurality of holes extending through it for vacuum drawing a trim cover stock against the front surface. The substrate has sets of parallel saw-tooth holder grooves in a peripheral margin of the back surface adjacent to an edge of the substrate that is to be wrapped by the trim cover stock and transverse manifold grooves that communicate with the holder grooves. An adhesive is applied to the front surface and the peripheral margin and the substrate is supported on a vacuum buck so that the peripheral margin overhangs the buck and the manifold grooves communicate with a vacuum source of the buck. The trim cover stock is drawn against the front surface of the substrate and a marginal portion of the trim cover stock is simultaneously drawn against the peripheral margin of the back surface by vacuum to wrap the trim cover stock around the edge of the substrate. The marginal portion of the trim cover stock is drawn into the bottom of the holder grooves to provide a mechanical interlock between the marginal portion of the trim cover stock and sharp edges of the saw-tooth holder grooves. Alternate substrates have a porous strip of various cross sections.

24 Claims, 3 Drawing Sheets

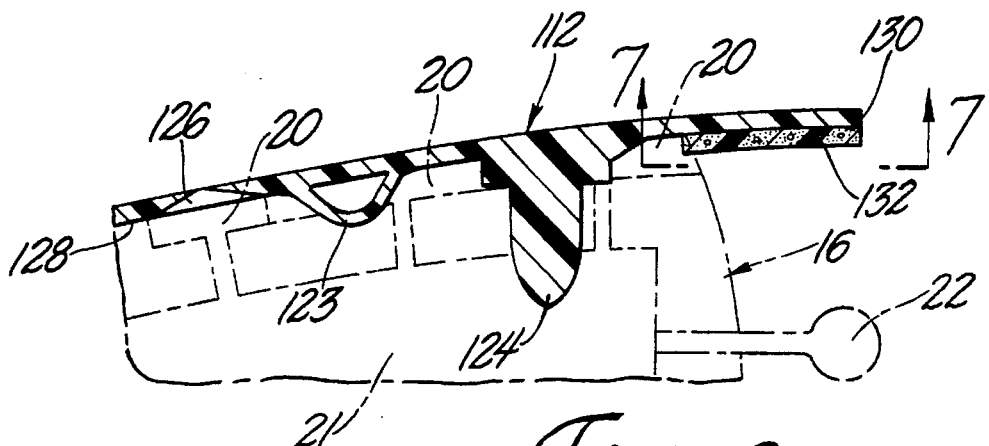
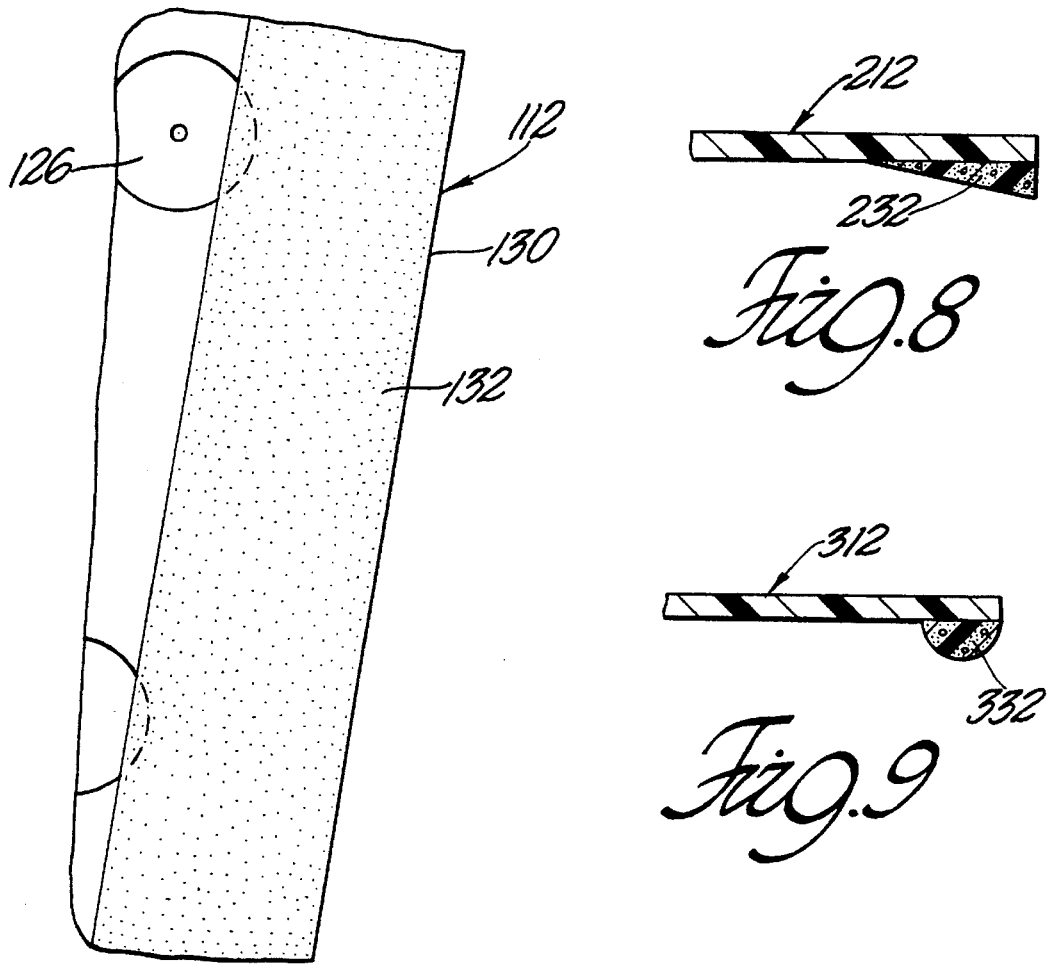

METHOD OF MAKING A COVERED ARTICLE BY VACUUM DRAWING

BACKGROUND OF THE INVENTION

This invention relates generally to covered articles such as automotive trim panels comprising a substrate and a decorative cover stock.

Such automotive trim panel typically comprise a thin substrate of relatively rigid plastic material that is molded in a functional and pleasing shape. A cover stock of relatively soft material such as foam backed vinyl is attached to the substrate so that it conforms to the shape of the substrate and covers a front surface of the substrate that is exposed to the automobile interior. Other examples of cover stock include lamination, organic or synthetic cloth or cloth combinations, foam, plastic and other materials generally used in automotive trim panels. One common way of attaching the cover stock to the substrate involves the use of a porous substrate that is adhesively coated and mounted on a vacuum buck which draws the cover stock against the front surface of the substrate so that it conforms to the shape of the substrate and bonds to the front surface.

This well known method is generally satisfactory for attaching the cover stock to the front surface of the substrate. However, it is also generally necessary to wrap the cover stock around an edge of the substrate and fasten it to the back surface of the substrate. This is presently done in a secondary operation. These known secondary operations include manually wrapping the cover stock around an edge of the substrate and fastening it to the back surface with adhesive, staples or other mechanical fasteners. Known secondary operations also include mechanically wrapping the cover stock around an edge of the substrate with slip rings and mechanical forming devices and fastening it to the back surface adhesively or mechanically. The cover stock whether wrapped manually or mechanically typically extends about a quarter of an inch onto the back surface of the substrate.

SUMMARY OF THE INVENTION

The object of this invention is to provide a substrate and a method of automatically wrapping a cover stock around an edge of the substrate when the cover stock is attached to the substrate in a vacuum drawing process.

A feature of the invention is that the substrate is specially configured in relation to the vacuum buck for wrapping the cover stock around an edge of the substrate and drawing the cover stock onto the back surface of the substrate when the cover stock is vacuum drawn against the surface of the substrate that is to be covered.

Another feature of the invention is that the vacuum buck is specially configured in relation to the substrate for wrapping the cover stock around an edge of the substrate and drawing the cover stock onto the back surface of the substrate when the cover stock is vacuum drawn against the front surface of the substrate.

Another feature of the invention is that the back surface of the substrate has a peripheral margin adjacent an edge to be wrapped that has passages for drawing the cover stock against the peripheral margin so that it wraps around the edge.

In one aspect, yet another feature of the invention is that the back surface of the substrate has a peripheral margin adjacent an edge of the substrate that is shaped to mechanically grip a cover stock that is automatically wrapped around the edge of the substrate and vacuum drawn against the peripheral margin.

In one aspect still yet another feature of the invention is that the back surface of the substrate has a peripheral margin adjacent an edge to be wrapped that is shaped to increase the surface area of the peripheral margin for bonding a cover stock that is automatically wrapped around the edge of the substrate and vacuum drawn against the peripheral margin.

BRIEF DESCRIPTION OF THE DRAWINGS

The above and other objects, features and advantages of the invention will become more apparent from the following description taken in conjunction with the accompanying drawings wherein like references refer to like parts and wherein:

FIG. 6 is a section similar to FIG. 2 showing the relationship of an alternate substrate and the vacuum buck of FIG. 1 which is shown in phantom;

FIG. 7 is a view taken substantially along the line 7—7 of FIG. 6 looking in the direction of the arrows;

FIG. 8 is a partial section of another alternative substrate; and

FIG. 9 is a partial section of still another alternate substrate.

DESCRIPTION OF THE INVENTION

Figure 1:
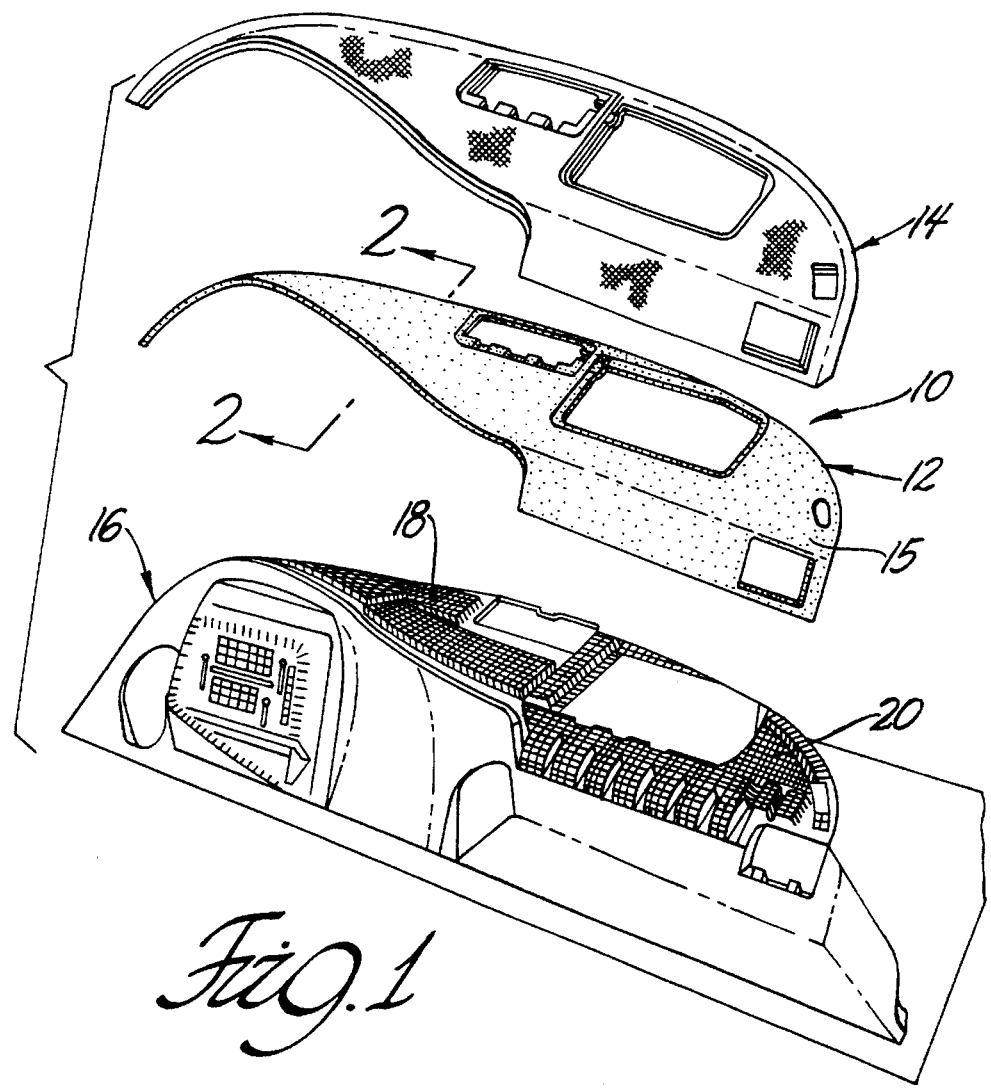
FIG. 1 is an exploded perspective view of a an automotive trim panel being constructed in accordance with the invention.

Referring now to the drawing, FIG. 1 shows an automotive trim panel 10 in the process of being constructed in accordance with the invention. The automotive trim panel 10 comprises a substrate 12 of relatively rigid plastic material such as polycarbonate, polypropylene or any injection moldable plastic and such material may be filled with glass fibers or the like. The substrate may also be a metal casting or stamping that is molded to the final shape needed for functional and pleasing shape of the finished trim panel 10. The substrate can also be made of a porous fiber board like material and other moldable compositions that meet the specifications for a substrate and allow movement or evacuation of air through them. The trim panel 10 further comprises a cover 14 of relatively soft and flexible decorative material such as expandable foam backed vinyl that is generally die cut from a continuous sheet of the material so that it is larger than a front surface 15 of the substrate that is to be covered. Other examples of a suitable cover stock 14 include laminations, organic or synthetic cloth or cloth combinations, foam, plastic and other materials generally used in automotive trim panels.

Figure 2:
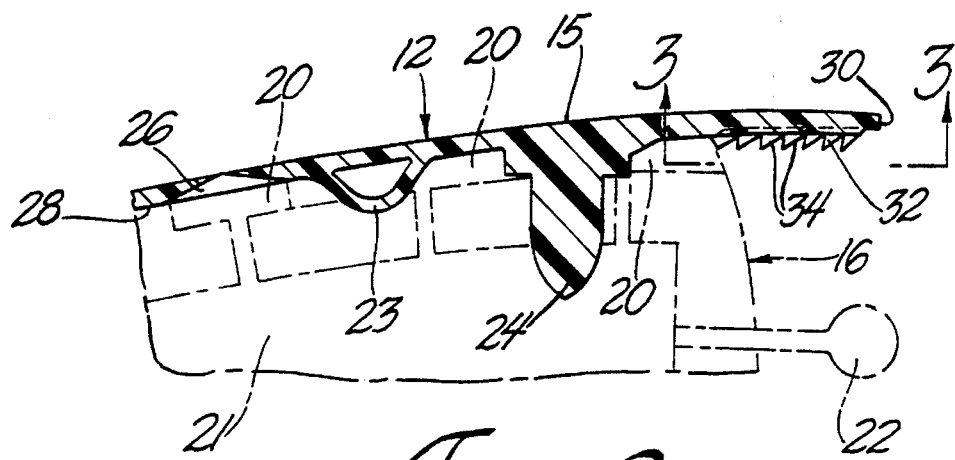
FIG. 2 is a section of the substrate of FIG. 1 taken substantially along the line 2—2 of FIG. 1 looking in the direction of the arrows; and showing the relationship of the substrate and the vacuum buck of FIG. 1 which is shown in phantom.
Figure 4:
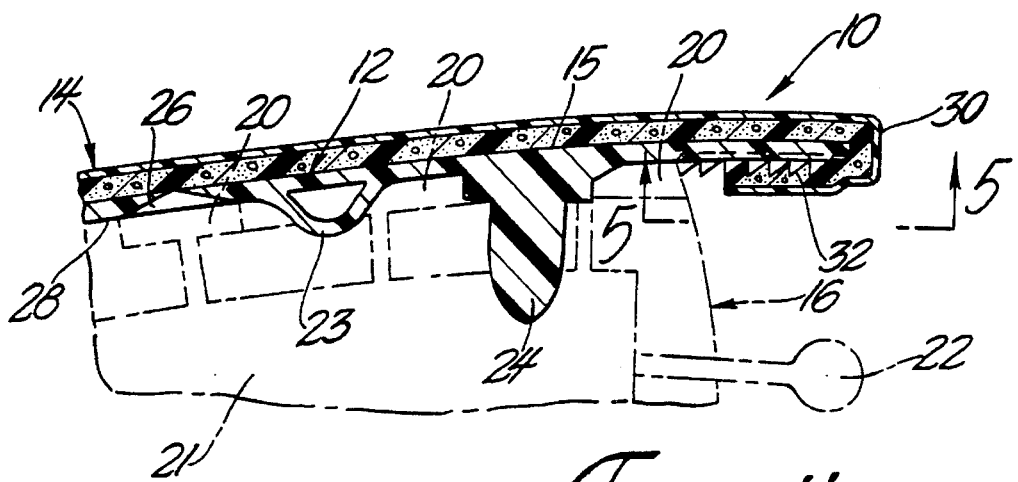
FIG. 4 is view similar to FIG. 2 showing the cover stock of FIG. 1 attached to and wrapped around an edge of the substrate of FIG. 1.

The cover stock 14 is attached to the substrate 12 by means of a vacuum buck 16 that has a support surface 18 that conforms to the back surface of the substrate 12 as indicated in FIGS. 2 and 4. The support surface 18 has several surface grooves 20 in a grid pattern that are fluidly connected to an internal plenum 21 that is evacuated by a pump 22 and operates in a well known manner to provide suction in the surface grooves 20.

The substrate 12 has hollow strengthening ribs 23 and locator pins 24 on the back surface side that are accommodated by the support surface 18 of the vacuum buck as shown in FIGS. 2 and 4. The substrate 12 also has a plurality of cone shaped holes 26 that extend through the substrate for drawing the cover 14 against the front surface 15. These cone shaped holes 26 are large at the back surface 28 to facilitate fluid communication with the surface grooves 20 of the vacuum buck 16 and very small at the front surface 15 so that the presence of the holes 26 is substantially visually imperceptible in the cover 14 when it is attached to the substrate 12.

Figure 5:
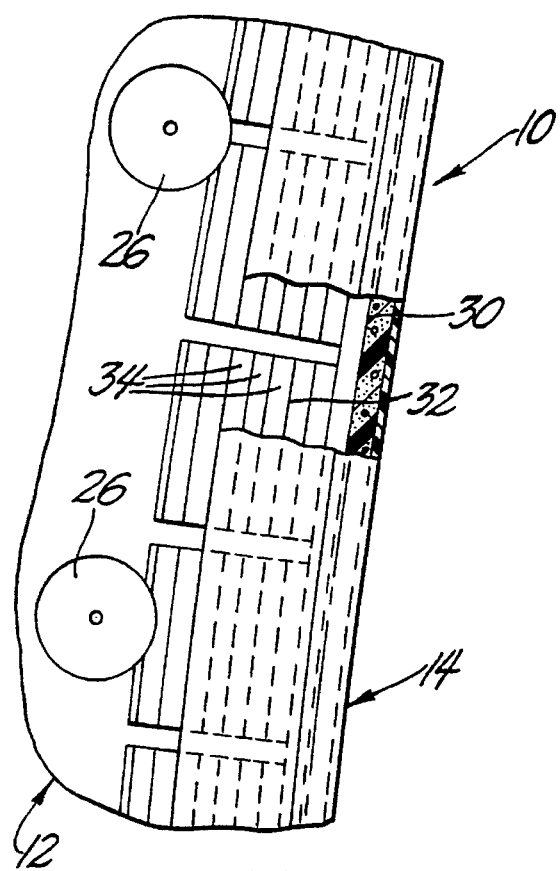
FIG. 5 is a view taken substantially along the line 5—5 of FIG. 4 looking in the direction of the arrows.

The substrate 12 includes an edge 30 that is wrapped by the cover stock 14 as shown in FIGS. 4 and 5. The back surface 28 of the substrate 12 has a peripheral margin 32 adjacent the edge 30 that is specially shaped for wrapping the cover 14 around the edge and attaching it to the back surface 28. The substrate 12 and the vacuum buck 16 are specifically configured with respect to each other to facilitate this edge wrapping automatically when the cover 14 is attached to the substrate 12.

Figure 3:
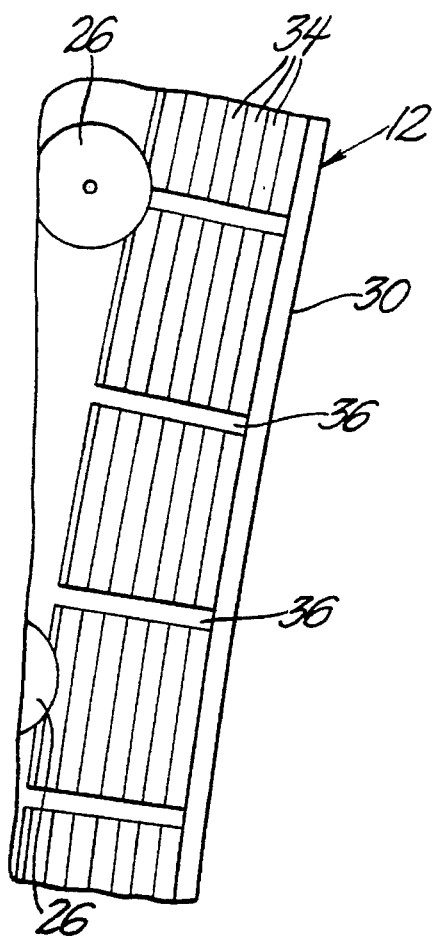
FIG. 3 is a view taken substantially along the line 3—3 of FIG. 2 looking in the direction of the arrows.

More specifically, the support surface 18 of the vacuum buck 16 is configured in relation to the back surface 28 of the substrate so that the peripheral margin 32 overhangs the support surface 18 when the substrate 12 is positioned on the vacuum buck 16 for attaching the cover stock 14 as shown in FIGS. 2 and 3. Moreover the peripheral margin 32 has a plurality of and preferably at least two sets of parallel holder grooves 34 that are generally parallel to the edge 30 that is to be wrapped and at least one but preferably a plurality of manifold grooves 36 that intersect the holder grooves 34 for establishing fluid communication with the surface grooves 20 of the vacuum buck 16 when the substrate 12 is positioned on the vacuum buck 16 as shown in FIGS. 2 and 3. The manifold grooves 36 extend transversely to the holder grooves 34 and preferably perpendicular to the holder grooves 34 as shown in FIGS. 2 and 3. The parallel holder grooves 34 and or the manifold grooves 36 may also be intersected by at least one and preferably a plurality of the conical holes 26 as shown in FIGS. 3 and 5 to enhance fluid communication with the surface grooves 20 of the vacuum buck 16.

The holder grooves 34 are saw tooth in cross section as best shown in FIG. 2 so as to provide a mechanical interlock with the cover stock 14 as shown in FIG. 4.

The trim panel 10 is constructed in the following manner. The substrate 12 is mounted on the vacuum buck 16 so that the peripheral margin 32 overhangs the vacuum buck 16 as shown in FIGS. 2 and 3. The substrate 12 has an adhesive on the top surface of the substrate and the peripheral margin 32. This adhesive may be applied before or after the substrate 12 is mounted on the vacuum ,.buck 16. Any one or two component water or solvent based adhesive is suitable.

The expandable foam backed vinyl cover stock 14 is then heated and drawn against the top surface of the substrate 14 by vacuum or suction pulling through the cone shaped holes 26. At the same time a marginal portion of the heated cover stock 14 is wrapped around the edge 30 and drawn against the peripheral margin 32 of the back surface 28 by vacuum or suction pulling through the holder grooves 34 from the surface grooves 20 via the manifold grooves 36 and conical holes 26. The marginal portion of the cover stock 14 is bonded the adhesive to provide a trim cover stock 14 that is wrapped around the edge 30 tightly and fastened to the peripheral margin 32 of the back surface 28. The marginal portion of the plastic cover stock 14 is also drawn into bottoms of the holder grooves 34 to provide a mechanical interlock between the marginal portion of the plastic cover stock 14 and the sharp ridges of their saw tooth cross section. This interlock maintains the trim cover stock 14 tightly wrapped around the edge 30. The saw tooth cross section also increases the surface area of the peripheral margin 32 that is bonded to the trim cover stock 14.

Thus the plastic trim cover stock 14 is wrapped around an edge and fastened to the back surface of the substrate 12 automatically when the cover stock 14 is attached to the front surface 15. This eliminates any need for secondary manual and/or mechanical operations, to wrap at least some of the edges of a covered article, such as an automotive trim panel.

FIG. 6 shows an alternate substrate 112 mounted on the vacuum buck 16 for attaching the trim cover stock 14 to provide an automotive trim panel such as the trim panel 10 shown in FIG. 1.

The substrate 112 has hollow strengthening ribs 123, locator pins 124 and cone shaped holes 126 that are identical in construction and function to the corresponding elements of substrate 12. However, the edge 130 that is wrapped by the cover stock 14 has a peripheral margin 132 adjacent the edge 130 that is different.

The peripheral margin 132 is still shaped to overhang the support surface 18 when the substrate 112 is positioned on the vacuum buck 16 for attaching the cover stock 14 as shown in FIG. 6. The area at the back surface 128 however is not grooved to provide fluid passages. In substrate 112, the structure and function of the grooves 34 and 36 is replaced by a porous strip 134 which provides fluid passages at the back surface 128 in the area of the peripheral margin 132.

The porous strip 134 preferably commences at the edge 130 and it must be wide enough to communicate with the surface grooves 20 of the vacuum buck 16 so that the cover stock 14 is wrapped around the edge 130 and drawn against the porous strip 134 by suction pulling through the surface grooves 20. The porous strip 134 may also communicate via the cone shaped holes 126 by overlying a portion as shown in FIG. 7.

The porous strip 134 can be made of any hard open cell material and it can be attached to the substrate 112 in any suitable manner such as by mechanical attachment, adhesive bonding or welding of a preformed strip. The porous strip 136 could also be injection molded in place or poured in place using a reactive porous material that adheres to the surface of the substrate 112.

The alternative substrate 112 is useful in situations where grooves such as the holder grooves 34 and manifold grooves 36 of the substrate 12 are difficult to mold. Furthermore, the porous strip 136 need not be rectangular as shown in FIGS. 6 and 7. Other shapes may be used. FIG. 8 shows a substrate 212 having porous strip 232 that is triangular in cross section while FIG. 9 shows a substrate 312 having a porous strip 332 that is semi-circular in cross section.

Moreover while the invention has been described in connection with a vacuum drawing operation, it should be understood that any differential pressure operation such as pneumatic pressure forming can be used.

In other words, the invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A method of making a covered article having a substrate and a cover comprising:

providing a substrate having a front surface to be covered, a back surface and a plurality of holes extending through it from the front surface to the back surface for vacuum drawing a cover against the front surface of the substrate, providing fluid passages at the back surface in a peripheral margin adjacent an edge of the substrate to be wrapped by the cover, supporting the substrate on a vacuum buck so that the peripheral margin of the back surface overhangs the vacuum buck and the fluid passages communicate with a vacuum source of the buck, and forming a cover stock against the front surface of the substrate and a marginal portion of the cover stock against the peripheral margin of the back surface by pressure differential and with an adhesive disposed therebetween to provide a cover stock that is wrapped around the edge of the substrate and adhered to the substrate.

2. The method as defined in claim 1 wherein the fluid passages comprise a plurality of holder grooves parallel to the edge and wherein at least one manifold groove communicates with the holder grooves.

3. The method as defined in claim 2 wherein the marginal portion of the cover stock is drawn into the holder grooves so as to provide a mechanical interlock between the marginal portion of the cover stock and the holder grooves to maintain the cover stock tightly wrapped around the edge of the substrate.

4. The method as defined in claim 2 wherein the holder grooves comprise two sets of holder grooves that are parallel to each other in each set and wherein the manifold groove communicates with each of the holder grooves in the two sets.

5. The method as defined in claim 4 wherein at least one of the holes extending through the substrate communicates with at least one of the holder grooves or the manifold groove to enhance fluid communication with the vacuum source of the vacuum buck.

6. The method as defined in claim 3 wherein the holder grooves have a saw tooth cross section that provides sharp ridges between the holder grooves and the cover is drawn into the holder grooves so as to provide a mechanical interlock between the marginal portion of the cover stock and sharp ridges.

7. The method as defined in claim 1 wherein the fluid passages are provided by a porous strip.

8. The method as defined in claim 7 wherein the porous strip is a hard open cell material.

9. The method as defined in claim 8 wherein the porous strip is preformed and attached to the substrate.

10. The method as defined in claim 8 wherein the porous strip is molded in place.

11. A method of making a covered article having a substrate and a cover comprising:

providing a substrate having a front surface to be covered, a back surface and a plurality of holes extending through it from the front surface to the back surface for vacuum drawing a cover against the front surface of the substrate, providing fluid passages at the back surface in a peripheral margin adjacent an edge of the substrate to be wrapped by the cover, applying an adhesive to the front surface of the substrate and the peripheral margin at the back surface and supporting the substrate on a vacuum buck so that the peripheral margin of the back surface overhangs the vacuum buck and the fluid passages communicate with a vacuum source of the buck, and forming a cover stock against the front surface of the substrate and a marginal portion of the cover stock against the peripheral margin of the back surface by pressure differential to provide a cover stock that is wrapped around the edge of the substrate.

12. The method as defined in claim 11 wherein the fluid passages comprise a plurality of holder grooves parallel to the edge and at least one manifold groove that communicates with the holder grooves.

13. The method as defined in claim 12 wherein the marginal portion of the cover stock is drawn into the holder grooves so as to provide a mechanical interlock between the marginal portion of the cover stock and the holder grooves to maintain the cover stock tightly wrapped around the edge of the substrate.

14. The method as defined in claim 12 wherein the holder grooves are arranged in at least two sets of holder grooves that are parallel to each other in each set and wherein the at least one manifold groove is perpendicular to and communicates with each of the holder grooves in the two sets.

15. The method as defined in claim 14 wherein at least one of the holes extending through the substrate communicates with at least one holder groove or the at least one manifold groove to enhance fluid communication with the vacuum source of the vacuum buck.

16. The method as defined in claim 13 wherein the holder grooves have a saw tooth cross section that provides sharp ridges between the holder grooves and the cover is drawn into the holder grooves so as to provide a mechanical interlock between the marginal portion of the cover stock and sharp ridges.

17. The method as defined in claim 11 wherein the fluid passages are provided by a porous strip.

18. The method as defined in claim 17 wherein the porous strip is a hard open cell material.

19. The method as defined in claim 18 wherein the porous strip is preformed and attached to the substrate.

20. The method as defined in claim 18 wherein the porous strip is molded in place.

21. A method of making a trim panel having a substrate and a cover stock for the substrate comprising:

providing a substrate having a front surface to be covered, a back surface and a plurality of conical holes extending through it from the front surface to the back surface for vacuum drawing a trim cover stock against the front surface of the substrate, forming a plurality of parallel holder grooves of saw tooth cross section in a peripheral margin of the back surface generally parallel to an edge of the substrate to be wrapped by the cover stock and at least one manifold groove that extends transversely to and communicates with each of the parallel holder grooves, applying an adhesive to the front surface of the substrate and the peripheral margin of the back surface and supporting the substrate on a vacuum buck so that the peripheral margin overhangs the vacuum buck and the at least one manifold groove communicates with a surface slot of the vacuum buck that is connected to a vacuum source, forming a trim cover stock against the front surface of the substrate and a marginal portion of the trim cover stock against the peripheral margin of the back surface by pressure differential to provide a trim cover stock that is wrapped around the edge of the substrate, and the marginal portion of the trim cover stock being drawn into the holder grooves to provide a mechanical interlock between the marginal portion of the trim cover stock and sharp ridges of the holder grooves to maintain the trim cover stock tightly wrapped around the edge of the substrate.

22. The method of making the automotive trim panel as defined in claim 21 wherein the substrate is made of a relatively rigid plastic that is molded to a final shape needed for the functional and pleasing shape of the trim panel and the cover stock is a relatively soft and flexible decorative material.

23. The method of making the automotive trim panel as defined in claim 22 wherein the cover stock is an expandable foam backed vinyl.

24. The method of making the automotive cover stock trim panel as defined in claim 22 wherein the trim is formed against the front surface and peripheral margin of the back surface of the substrate by a vacuum drawing operation.

* * * * *